United States Patent Office 3,436,317
Patented Apr. 1, 1969

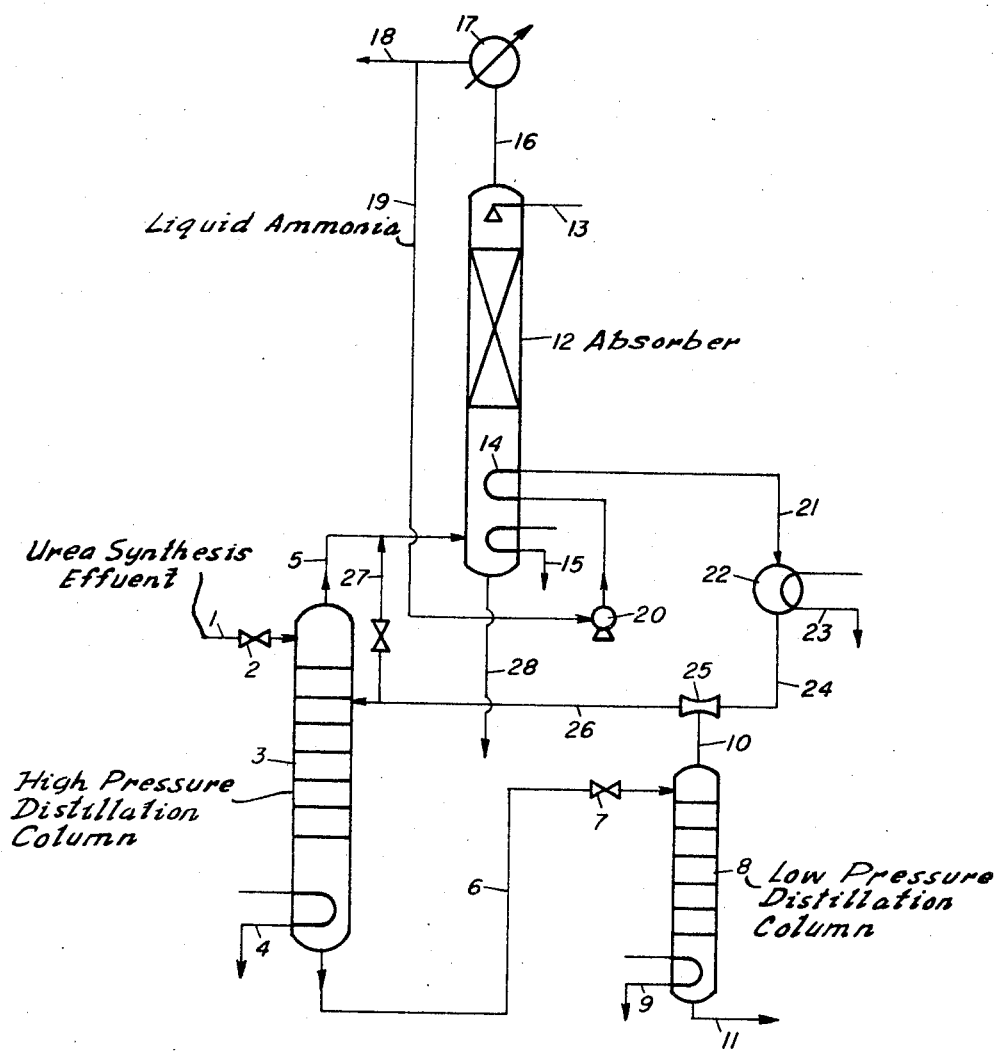

3,436,317
TREATMENT OF UNREACTED SUBSTANCES IN UREA SYNTHESIS
Eiji Otsuka, Fujisawa, Shigeru Inoue, Kamakura, and Kazumichi Kanai, Fujisawa, Japan, assignors to Toyo Koatsu Industries, Incorporated, Tokyo, Japan, a corporation of Japan
Filed Oct. 17, 1967, Ser. No. 675,962
Claims priority, application Japan, Oct. 25, 1966, 41/69,994
Int. Cl. B01d 5/00, 3/34
U.S. Cl. 203—42     7 Claims

ABSTRACT OF THE DISCLOSURE

Urea synthesis effluent is passed into a high pressure distillation zone from which bottoms liquid is introduced into a low pressure distillation zone in which zone liquid bottoms rich in urea are separated. Overhead vapors from both distillation zones are passed to an absorber. Pure ammonia vapor from the top of the absorber is condensed with a portion of the condensed ammonia being revaporized in heat exchange with absorbate, being further heated and then passing through an ejector where it aspirates overhead vapor from the low pressure distillation column. Aspirated gaseous mixture and high pressure distillation column overhead is passed to the absorption zone.

---

This invention relates to the treatment of unreacted ammonia and carbon dioxide present in urea synthesis effluent and more particularly to an improved method of elevating the pressure of a gaseous mixture comprising ammonia, carbon dioxide and water vapor separated from a urea synthesis effluent under a low pressure.

Urea synthesis processes with solution recycle widely practiced today, generally use a method wherein the urea synthesis effluent is distilled at a high pressure of 10 to 30 kg./cm.$^2$ gauge and then a low pressure of 0 to 5 kg./cm.$^2$ gauge to separate unreacted ammonia and carbon dioxide as a gaseous mixture of ammonia, carbon dioxide and water vapor from the urea synthesis effluent. To accomplish this, the gaseous mixture from the low pressure distillation is absorbed in an absorbent at the lower pressure, the pressure of the resulting absorbate is elevated to that of the high pressure distillation, the gaseous mixture from the high pressure distillation is absorbed in the low pressure absorbate and the absorbate is recycled to the urea synthesis step. However, the following problem occurs: the absorption of the gaseous mixture from the low pressure distillation is conducted under substantially the same pressure as that of the low pressure distillation, the concentration of ammonia and carbon dioxide in the resulting absorbate is so low that when this absorbate is used as the absorbent in the high pressure absorption, the high pressure absorbate obtained is too dilute due to the large amount of water. When the high pressure absorbate is recycled to the urea synthesis, not only unreacted ammonium carbamate but also an undesirable amount of water is recycled therewith. The excess water is undesirable in the urea synthesis step because it has an adverse effect upon the conversion ratio and it is necessary to absorb the separated gaseous mixtures under a pressure which is undesirably high. This is presently accomplished by (a) compressing the gaseous mixture from the low pressure distillation using a compressor; (b) pressurizing the aqueous solution of ammonium carbamate with a pump and feeding it into an ejector to aspirate and compress the gaseous mixture from the low pressure distillation; and (c) reducing the pressure of the urea synthesis effluent from the synthesis autoclave to that of the high pressure distillation by an ejector which aspirates and compresses the gaseous mixture from the low pressure distillation. However, problems such as the poor operation and high maintenance and increased electrical power consumption occur when using a compressor. If an ejector is used, although it is mechanically simple, the urea synthesis effluent and the aqueous solution of ammonium carbamate have a highly corrosive action and the high vapor pressure causes reduction of efficiency.

According to the present invention, the method for treating unreacted substances in a urea synthesis process comprise feeding the effluent containing urea, unreacted ammonia, unreacted carbon dioxide and water from a urea synthesis autoclave by a high pressure distillation and then by a low pressure distillation to remove gaseous mixtures containing unreacted ammonia and carbon dioxide; absorbing the gaseous mixture from the high pressure distillation in an aqueous absorbent solution while conducting an indirect heat exchange with liquid ammonia having a pressure higher than that of said high pressure distillation, thereby vaporizing the liquid ammonia. The resulting gaseous ammonia is fed through an ejector to reduce the pressure of the gaseous ammonia to that of the high pressure distillation, aspirating the gaseous mixture from the low pressure distillation through the ejector to increase the pressure thereof, and feeding the same with said ammonia and said gaseous mixture from said high pressure distillation to the absorbing step.

To practice the present invention efficiently, the pressure and temperature conditions of the high pressure distillation, high pressure absorption, and low pressure distillation must necessarily be adjusted in accordance with each other.

If the temperature of the high pressure absorption is elevated, the pressure of the ammonia gasified by indirect heat exchange with the absorbate in the high pressure absorption can be elevated and the operating conditions in the ejector are improved. However, the increased temperature of the high pressure absorption necessitates a rise in the absorption pressure to obtain a concentrated absorbate. Also, since the pressure of the high pressure absorption is substantially equal to the pressure of the high pressure distillation, the increased pressure causes a rise in the pressure of the high pressure distillation. Since an increased pressure of the high pressure distillation reduces the separation of the unreacted ammonia and carbon dioxide at a given temperature, an increased amount of the gaseous mixture separates in the low pressure distillation and the operation of the ejector becomes less efficient. However, this problem can be easily solved by elevating the temperature of the high pressure distillation. Generally, the higher the temperature and pressure of the high pressure distillation and high pressure absorption, the more advantageous the operating conditions of the ejector. But, it is apparent that the optimum values of these operating conditions must include consideration of the heat economy and other such factors.

The figure is a diagrammatical presentation of one embodiment of the present invention. Urea synthesis effluent containing urea, unreacted ammonia and carbon dioxide and water and obtained by reacting ammonia with carbon dioxide at a mol ratio of $NH_3/CO_2$ of 2.2 to 6:1 at a temperature of 160 to 220° C. under a pressure of 150 to 400 kg./cm.$^2$ gauge is introduced into the upper part of high pressure distillation column 3 with the pressure reduced to 15 to 30 kg./cm.$^2$ through reduction valve 2 through a line 1. Preferably, the high pressure distillation column is provided with plates and the head temperature is maintained at 110 to 150° C. while the still temperature is kept at 140 to 180° C. by heating pipe 4. By lowering the head temperature, the amount of water in the gaseous mixture withdrawn from the head can be reduced. If a heater and gas-liquid separator (not illustrated) are substituted for high pressure distillation columns 3, the urea synthesis effluent, after having the pressure reduced, may be heated through a heater and then be introduced into a gas-liquid separator to separate the gaseous mixture from the urea synthesis effluent. High pressure distillation column 3 separates most of the unreacted ammonia and carbon dioxide from the urea synthesis effluent as a gaseous mixture with water vapor, which is withdrawn through line 5. The still residue of the urea synthesis effluent, from which the greater parts of the unreacted ammonia have been separated, is passed through line 6, has the pressure reduced by reduction valve 7 to a pressure of 0 to 10 kg./cm.$^2$ gauge and is introduced into the upper part of low pressure distillation column 8. Low pressure distillation column 8 is preferably of the same structure as that of high pressure distillation column 3 and the head temperature is maintained at 90 to 130° C. while the still temperature is kept at 110 to 150° C. by heating pipe 9. A heater and gas-liquid separator may be substituted for low pressure distillation column 8 in the same manner as described above for high pressure distillation column 3. Low pressure distillation column 8 separates substantially all of the unreacted ammonia and carbon dioxide from the high pressure residue and is removed from the head through line 10. When all of the unreacted ammonia and carbon dioxide are not substantially separated by low pressure distillation column 8, the remaining unreacted ammonia and carbon dioxide may be separated from the low pressure residue through a gas separator (not illustrated) under the same or lower pressure as that in low pressure distillation column 8 and when substantially all of the unreacted ammonia and carbon dioxide have been separated, the residue containing urea is removed through line 11. The urea is recovered by such known finishing steps as, for example, vacuum concentration and crystallization.

The gaseous mixture in line 5 is introduced into the bottom of high pressure absorber 12 and is absorbed by flowing counter current to an absorbent, such as for example, water, an aqueous ammonia solution, aqueous solution of urea or a part of urea synthesis effluent, introduced into the top of the absorber through line 13. The heat of absorption generated by the absorption is removed by evaporating liquid ammonia in cooling pipe 14 in the bottom of absorber 12. The evaporation of liquid ammonia is not sufficient to remove all of the generated heat of absorption and the excess heat is preferably utilized as a heat source for concentrating and/or crystallizing the solution of urea by passing the aqueous solution of urea through cooling pipe 15 in the bottom of absorber 12. If further cooling is necessary, water may be passed through a cooling pipe (not illustrated) in the bottom of absorber 12. The temperature in the bottom of high pressure absorber 12 is thus kept between 100 to 130° C. Ammonia not absorbed in absorber 12 is removed from the top of the absorber, and introduced into ammonia condenser 17 through line 16 to form liquid ammonia. Some of the liquid ammonia is returned to the urea synthesis through line 18 and the pressure of the remaining liquid ammonia is elevated to a pressure of 40 to 80 kg./cm.$^2$ gauge by pump 20 in line 19, introduced into the cooling pipe 14 and vaporized. The amount of the liquid ammonia passed through cooling pipe 14 is determined by the amount of heat of absorption and operating conditions of ejector 25. The ammonia, which is vaporized in cooling pipe 14, is introduced into preheater 22 through line 21, where the temperature is raised to 120 to 160° C. by heating pipe 23 and is then fed into ejector 25 through line 24. The pressure is reduced by expansion from a pressure of 40 to 80 kg./cm.$^2$ gauge to the same pressure as high pressure still 3 or high pressure absorber 12, i.e., a pressure of 15 to 30 kg./cm.$^2$ gauge aspirated. The gaseous mixture drawn through line 10 by ejector 25 is aspirated to the pressure of high pressure distillation column 3. The condensation caused by the temperature drop occurring during expansion of the gaseous ammonia in ejector 25 can be prevented by preheating the gaseous ammonia in the above described manner. The pressurized gaseous mixture is introduced into high pressure distillation column 3 through line 26 or into high pressure absorber 12 through lines 26 and 27, but in either case the gaseous mixture is eventually absorbed in the high pressure absorber. Since the water content in the pressurized gaseous mixture is comparatively high, it is preferable to introduce the gaseous mixture into the still in the region of a rectifying column (not illustrated), to obtain a gaseous mixture of reduced water content.

When a gas separator (not illustrated) is used following low pressure distillation column 8, the gaseous mixture separated therein is condensed by a gas condenser (not illustrated). The resulting condensate will have the pressure elevated and is then introduced into high pressure distillation column 3 and the separated ammonia and carbon dioxide are withdrawn through the head along with the ammonia and carbon dioxide separated from the urea synthesis effluent. The absorbate discharged from the bottom of high pressure absorber 12 is recycled to the urea synthesis reaction through line 28.

Advantages of the present invention are: (1) all of the unreacted ammonia and carbon dioxide contained in the urea synthesis effluent can be separated as a high pressure gaseous mixture to produce a concentrated absorbate and, even if this absorbate is returned to the urea synthesis, a conversion ratio is obtained which is higher than that of the conventional urea synthesis with solution recycle while the steam consumption used for the separation of the unreacted ammonia and carbon dioxide is minimal and, (2) gaseous ammonia that is used to operate the ejector does not corrode the ejector as rapidly as the urea synthesis effluent or aqueous solution of ammonium carbamate used in conventional methods and the operating efficiency thereof is higher.

The following is an example of one embodiment of the present invention.

EXAMPLE

A urea synthesis effluent containing 232 kg./hr. of urea, 214 kg./hr. of ammonia, 80 kg./hr. of carbon dioxide and 92 kg./hr. of water was withdrawn from a urea synthesis autoclave operating at a temperature of 200° C. and a pressure of 230 kg./cm.$^2$ gauge. The pressure of the effluent was reduced and the effluent was introduced into the upper part of a high pressure distillation column operating at a pressure of 20.5 kg./cm.$^2$ gauge. This pressure reduction separated the greater part of the excess ammonia, the effluent was heated to 165° C. by steam at a pressure of 10 kg./cm.$^2$ gauge in the still, to separate the greater part of the ammonia and carbon dioxide as a gaseous mixture with 8% ammonia and 3% carbon dioxide by weight remaining in the effluent. The residue discharged from the high pressure distillation column contained 232 kg./hr. of urea, 32 kg./hr. of ammonia, 12 kg./hr. of carbon dioxide and 124 kg./hr. of water and, after the pressure was reduced, the residue was introduced into the upper part of a low pressure distillation column. The still temperature was operated at a temperature of 145° C. and at a pressure of 5 kg./cm.$^2$ gauge, to separate most of the remaining ammonia and carbon dioxide. The residue of the aqueous urea solution, containing 232 kg./hr. of urea, 6 kg./hr. of ammonia, 2 kg./hr. of carbon dioxide and 106 kg./hr. of water, had the pressure further reduced to 0.3 kg./cm.$^2$ gauge and was introduced into a gas separator maintained at 115° C., where a gaseous mixture comprising 6 kg./hr. of ammonia, 2 kg./hr. of carbon dioxide and 18 kg./hr. of water was separated from the aqueous solution of urea, which contained 232 kg./hr. of urea and 88 kg./hr. of water.

The gaseous mixture withdrawn from the gas separator was introduced into a gas condenser with 30 kg./hr. of water at 50° C. and was condensed to an aqueous solution of ammonium carbamate containing 6 kg./hr. of ammonia, 2 kg./hr. of carbon dioxide and 48 kg./hr. of water.

After the pressure of this aqueous solution was elevated to 20.5 kg./cm.$^2$ gauge by a pump, the solution was preheated to 160° C. by a heat exchanger and then introduced into the high pressure distillation column.

The gaseous mixture comprising 26 kg./hr. of ammonia, 10 kg./hr. of carbon dioxide and 18 kg./hr. of water recovered from the low pressure distillation column was aspirated by an ammonia ejector driven by 152 kg./hr. of gaseous ammonia at a temperature of 140° C. and a pressure of 70 kg./cm.$^2$ gauge to produce a mixture having a pressure of 20.5 kg./cm.$^2$ gauge which was introduced into the high pressure distillation column. This gaseous mixture contacted the urea effluent flowing down through the high pressure distillation column and the gaseous mixture discharged from the head contained 366 kg./hr. of ammonia, 80 kg./hr. of carbon dioxide and 22 kg./hr. of water. This gaseous mixture was introduced into the bottom of a high pressure absorber under substantially the same pressure as that of the high pressure distillation column where 70% of the carbon dioxide and water were condensed with some of the ammonia by an aqueous solution containing 32 kg./hr. of urea, 61.4 kg./hr. of ammonia, 24 kg./hr. of carbon dioxide and 16.3 kg./hr. of water flowing down through the absorber. A concentrated absorbate comprising 32 kg./hr. of urea, 80 kg./hr. of ammonia, 80 kg./hr. of carbon dioxide and 32 kg./hr. of water was obtained. The temperature in the bottom of the absorber was maintained at 120° C. by vaporizing 152 kg./hr. of liquid ammonia having a pressure of 70 kg./cm.$^2$ gauge and cooling the urea slurry solution from a urea crystallizer. The temperature of the urea slurry solution was elevated by the heat transfer and was then returned to the concentrator.

152 kg./hr. of vaporized ammonia, after the temperature was raised to 140° C. by a preheater to prevent condensation of ammonium carbamate, were then introduced into an ejector. Some of this mixture was combined with the gaseous mixture from the high pressure distillation column and a gaseous mixture comprising 347.4 kg./hr. of ammonia, 24 kg./hr. of carbon dioxide and 6.6 kg./hr. of water introduced at the bottom of the high pressure absorber was condensed by a urea mother liquor containing 32 kg./hr. of urea and 8 kg./hr. of water and an aqueous ammonia solution containing 6 kg./hr. of ammonia and 2 kg./hr. of water introduced in the upper part of the absorber and which flowed toward the bottom of the absorber. 292 kg./hr. of pure gaseous ammonia gas withdrawn from the top of the absorber were condensed at 45° C. 134 kg./hr. of the resulting liquid ammonia were returned to the urea synthesis autoclave, 6 kg./hr. were used in the preparation of the abovementioned aqueous solution of ammonia and the pressure of 153 kg./hr. was elevated to 70 kg./cm.$^2$ gauge by a pump and fed to the cooling pipe in the bottom of the high pressure absorber where it was vaporized as described above.

The steam consumption in the above described process was about 0.6 ton as converted per ton of the urea product, while a conventional process (wherein a gaseous mixture separated in each distillation step was absorbed into an absorbent in turn from a low pressure to a high pressure and was returned to the urea synthesis conducted under substantially the same operating conditions of each column) required about 0.95 ton as converted per ton of the urea product.

What is claimed is:

1. In a method for treating unreacted ammonia and carbon dioxide in a urea synthesis effluent wherein said effluent is distilled in a high pressure distillation zone, the residue of said high pressure distillation is distilled in a low pressure distillation zone, and gaseous mixtures containing unreacted ammonia and carbon dioxide are removed from said high pressure and low pressure distillation zones, the improvement comprising the steps of absorbing the gaseous mixture from said high pressure distillation zone in an aqueous absorbent solution, heating a liquid ammonia stream having a pressure higher than the pressure of said high pressure distillation zone by indirect heat exchange with an absorbate formed by said absorbing step thereby vaporizing said liquid ammonia, feeding the vaporized ammonia through an ejector to reduce the pressure of said vaporized ammonia to the pressure of the high pressure distillation zone, aspirating the gaseous mixture from said low pressure distillation zone through the ejector to increase the pressure thereof, and absorbing said aspirated gaseous mixture and said gaseous mixture from said high pressure distillation zone.

2. The improvement of claim 1 wherein the aqueous absorbent solution is a member selected from the group consisting of water, an aqueous ammonia solution, an aqueous urea solution and part of said effluent.

3. The improvement of claim 1 wherein said gaseous mixture from said high pressure distillation zone is absorbed in the aqueous absorbent solution at a temperature between about 100 to about 130° C.

4. The improvement of claim 1 wherein the pressure of the liquid ammonia is between about 40 to about 80 kg./cm.$^2$.

5. The improvement of claim 1 wherein the vaporized ammonia is heated to a temperature between about 120 to about 160° C. prior to feeding into said ejector.

6. The improvement of claim 1 wherein at least some of the liquid ammonia is obtained by condensing the vaporized ammonia from said absorbing step.

7. The improvement of claim 1 wherein the aspirated gaseous mixture and the vaporized ammonia are fed to said high pressure distillation zone.

References Cited

UNITED STATES PATENTS

| | | | |
|---|---|---|---|
| 3,053,891 | 9/1962 | Cook et al. | 260—555 |
| 3,317,601 | 5/1967 | Otsuka et al. | 260—555 |
| 3,357,901 | 12/1967 | Otsuka et al. | 260—555 XR |

NORMAN YUDKOFF, Primary Examiner.

V. W. PRETKA, Assistant Examiner.

U.S. Cl. X.R.

203—73; 260—555